United States Patent [19]

Meneghello

[11] 4,281,973

[45] Aug. 4, 1981

[54] CASE STRUCTURE FOR ROTARY MACHINES

[76] Inventor: Gaetano Meneghello, Via Contra Lodi, 48, Vicenza, Italy

[21] Appl. No.: 9,613

[22] Filed: Feb. 5, 1979

[30] Foreign Application Priority Data

Feb. 9, 1978 [IT] Italy .................. 20125 A/78

[51] Int. Cl.³ .................. F04B 39/12; F04B 39/14
[52] U.S. Cl. .................. 417/424; 310/87; 415/DIG. 3
[58] Field of Search .................. 417/423, 424; 415/DIG. 3, 501; 310/42, 87, 88, 89

[56] References Cited

U.S. PATENT DOCUMENTS

| | | | |
|---|---|---|---|
| 2,556,435 | 6/1951 | Moehrl et al. | 310/87 X |
| 2,689,529 | 9/1954 | Wightman | 417/423 |
| 3,437,046 | 4/1969 | Tremain et al. | 415/501 X |
| 3,521,970 | 7/1970 | Deters | 417/424 |
| 4,015,633 | 4/1977 | Mandell | 417/424 X |

Primary Examiner—Edward L. Roberts
Attorney, Agent, or Firm—Guido Modiano; Albert Josif

[57] ABSTRACT

A case structure for rotary machines, particularly electric motors and multi-stage pumps having a prevailingly axial length, comprising a tubular member having roll-formed threads and at least one roll-formed groove in the peripheral wall for threadably engaging a fixed portion of the machine, a support for a rotary portion of the machine and two threaded caps at the ends of the tubular member. The threads may extend continuously along the wall of the tubular member. The machine portions are therefore easily assemblable and disassemblable by threading through one end of the tubular member, and the groove clamps the machine portions in the tubular member. Rolling of the threads provides stiffening and calibration of the tubular member, thus making it particularly suitable for machines having a great axial extension and small transverse dimension.

8 Claims, 9 Drawing Figures

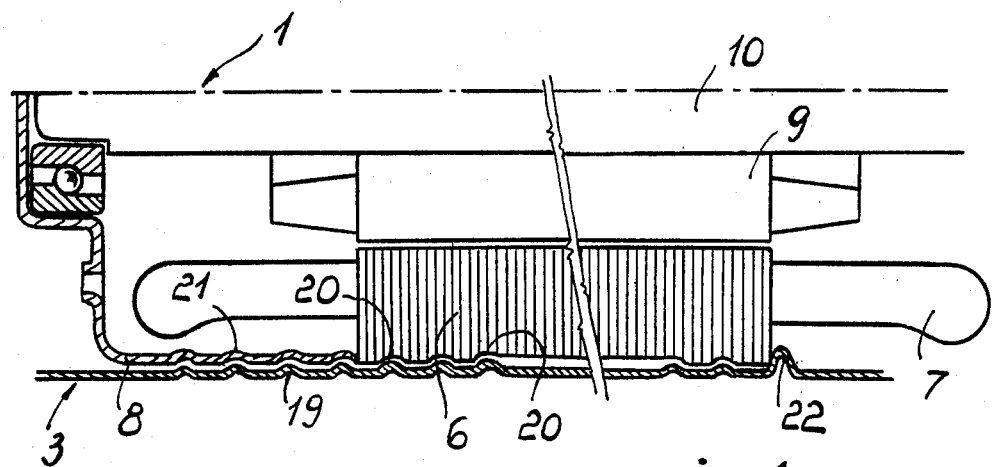
Fig. 4
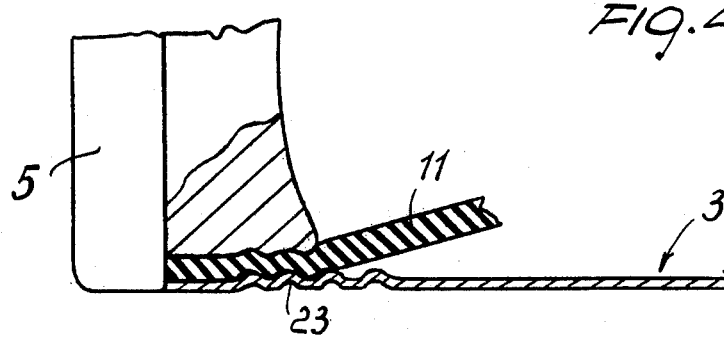
Fig. 5
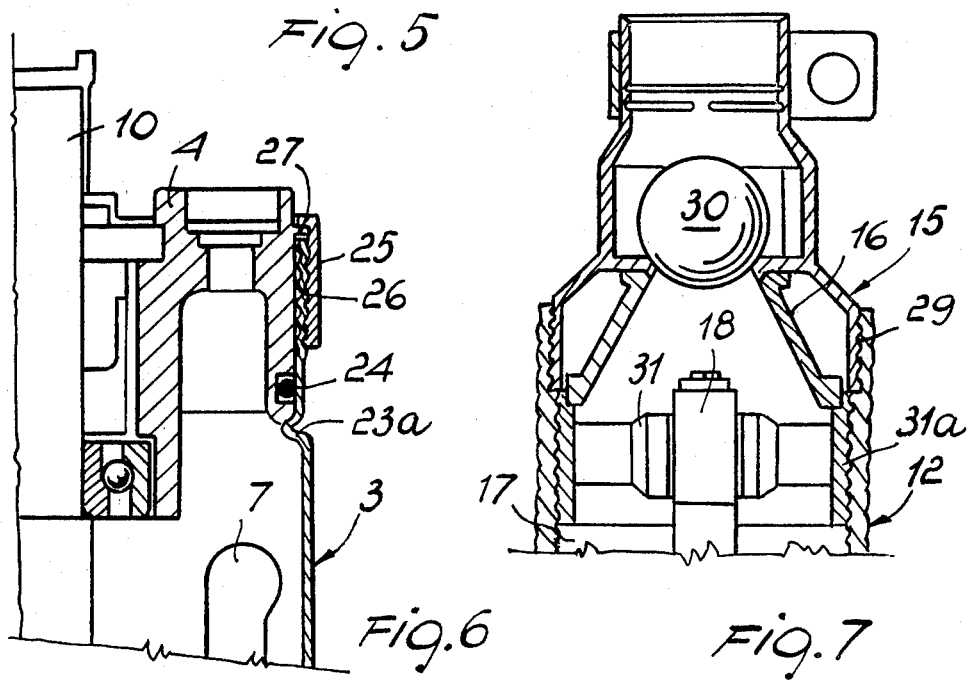
Fig. 6
Fig. 7

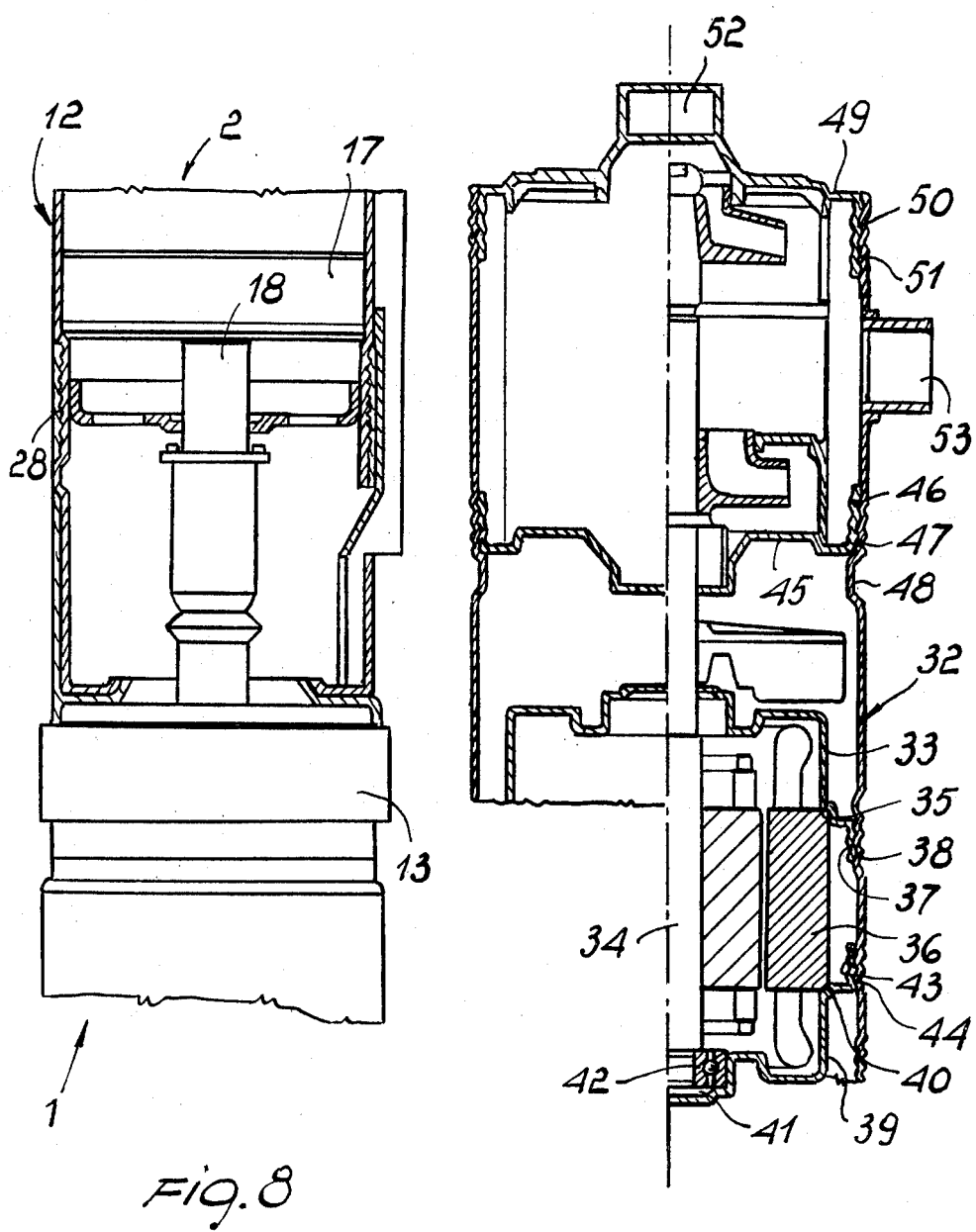

CASE STRUCTURE FOR ROTARY MACHINES

BACKGROUND OF THE INVENTION

This invention relates to a case structure for rotary machines having a prevailing axial extension. The invention is specially useful in the manufacture of electric motors and of pumps, particularly multi-stage pumps.

According to prior art techniques, cylindrical configuration rotary machines having a prevailingly axial extension (such as electric motors, and pumps) are produced by assembling the various electrical and mechanical components within cylindrical casings, in general of cast metal.

Such casings, in the instance of an electric motor, contain, by force fit or fastening through dowels or screws, the stator portion, whereas the rotor portion is carried by end caps which are centered and secured to the casing by means of screws, studs or through tie bolts.

The expert will recognize that the accomplishment of a structure so conceived involves the availability of an outer case, to be produced either by casing or machining a cylindrical body, and machining and finishing steps for providing it with detent, centering and securing devices for the parts contained therein.

When insertion of the inner components is carried out by force fitting under a press, then it will be apparent that subsequent disassembly for servicing purposes is a difficult process, as not easy is replacement of the stator windings unless the stator assembly is a removable one.

In addition to the above, if the machine has a considerable axial extension, as is the case with multi-stage pumps and motors where constraints to a limited diameter result in an increase of axial length, assembling of the end caps by means of tie rods and bars of considerable length further involves centering and alignment problems.

In an attempt to attenuate such problems, cases have been given an increased thickness dimension, and machined abutments have been formed thereon for centering the end caps, or alternatively threads for threadably engaging the same.

No less important than the technical problems mentioned above, are those problems which are connected with manufacturing economy, such as the time for preparing and machining the various components, in addition to the assembling time therefor, which are of considerable import indeed and affect the final cost of the resulting product in a decisive manner.

A similar situation is encountered by servicing, where disassembly and reassembly of the various parts are far from convenient to carry out, and involve much time and qualified labor.

In the instance of motors having a very long stator assembly, and small diameters, rewinding is virtually impossible unless the stator is removed from the case.

SUMMARY OF THE INVENTION

This invention sets out to provide a case structure for cylindrical machines, which, by virtue of its novel design, overcomes the technical and economical problems posed by the prior art techniques.

Thus, a primary object of the invention is to provide a case structure which affords direct assembling of the machine components.

Another object of the invention is to eliminate the use of conventional assembling means, such as longitudinal tie rods, studs, or screw fasteners.

A further object is to provide a structure which is easily disassemblable and reassemblable, and wherefrom the inner components can be easily withdrawn for servicing.

Yet another object of this invention is to provide a structure which, through a reduction and simplification of the assembling procedures, also reduces the construction and maintenance costs of the machine.

These and other objects, such as will be apparent hereinafter, are achieved by a case structure for rotary machines of prevailingly axial extension and of the type having at least one stationary portion and at least one rotary portion, in particular for electric motors and multi-stage pumps, the case structure comprising at least one tubular member having two ends and a plurality of roll-formed threaded portions and at least one groove roll-formed thereon, said plurality of threaded portions including at least one threaded portion adapted for threadably engaging said at least one stationary portion, at least one threaded portion for threadable engagement with a support for said at least one rotary portion, and at least one threaded portion at each of said ends of said tubular member for threadably engaging respective end caps of said case, said threaded portions having a depth and arrangement such as to allow subsequent insertion and removal in an axial direction of said at least one stationary portion and said at least one rotary portion through one of said ends of said tubular member, and said at least one groove being associated with one of said threaded portions and having a depth such as to lock axially at least said at least one stationary portion.

BRIEF DESCRIPTION OF THE DRAWINGS

Further features and advantages of the invention will be more clearly understood by making reference to a detailed description of some preferred embodiments thereof, given herein by way of example only and illustrated in the accompanying drawings on different scales, where:

FIG. 4 is an axial sectional view of a detail of the case constructed according to this invention;

FIG. 5 shows in an axial section the assembling of a sealing plug at the rear end of the motor;

FIG. 6 shows in an axial section the assembling of the front end cap;

FIG. 7 shows in an axial section the delivery head of the multistage pump of FIG. 3;

FIG. 8 is an axial sectional representation of the suction head of the multistage pump of FIG. 3; and FIG. 9 is an axial sectional view of a variation of the motor-pump set shown in the preceding figures.

DESCRIPTION OF THE PREFERRED EMBODIMENTS

Figure 1:
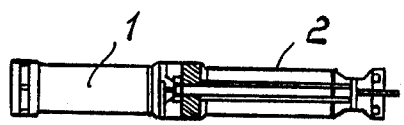
FIG. 1 is a general representation of a motor-pump set of a type having a considerable axial extension.

For clarity of illustration, the actual relative proportions of some parts of the invention have not been maintained in the drawings, such relative proportions being the proportions which will be indicated each time in the following description.

With reference to the drawing figures, a particular motor-pump unit or set of the submersible type will be described, having a sealed electric motor and being immersed in a liquid bath, although this same construction technique and the same solutions may also apply to any type of motor, pump, or cylindrical rotary machine.

A unit or set of this design is shown generally in FIG. 1, and comprises substantially an electric motor 1 and a multistage centrifugal pump 2, which are directly coupled together axially.

Figure 2:
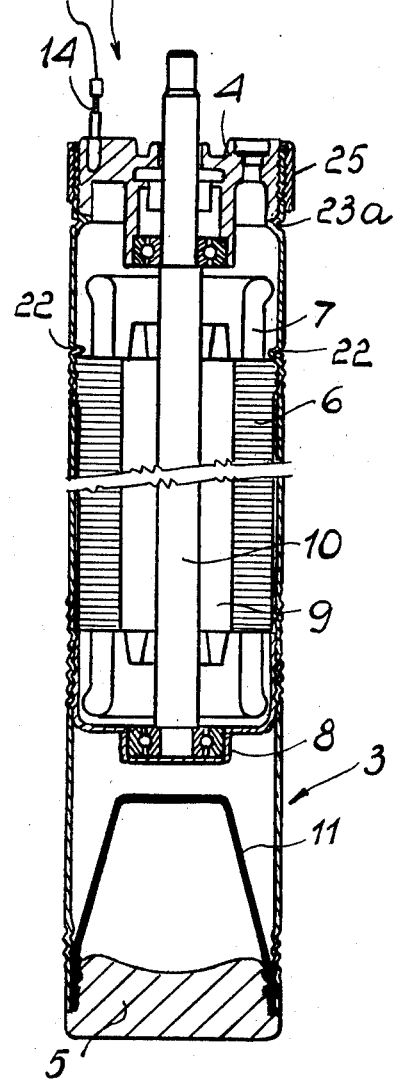
FIG. 2 is a sectional view of the set of FIG. 1, taken along a plane through the electric motor axis.

The electric motor 1, which is more clearly shown in FIG. 2, comprises in turn a first tubular member on outer case 3, of substantially cylindrical configuration, the details whereof will be described hereinafter, which is closed at the front by an end cap 4, and at the rear by an end cap or threaded plug 5.

Internally of the case, there are: a stator lamination 6 having stator or field windings 7, a rear thrust bearing carrier or support 8, a rotor 9 the shaft 10 whereof protrudes from said end cap 4. Being the motor, as mentioned, a sealed motor in a liquid bath, the plug 5 seals against a frustum-like expansion member 11, which is made of an elastic material and allows for the expansion of the oil in the motor during the motor operation. The pump 2 comprises a second tubular member or outer case 12, also substantially cylindrical, and an end cap 13 whereof, located on the suction side, is removably connected to the end cap 4 of the motor 1 by means of threaded studs 14, which are secured to the cap 4 and receive nuts 14a by which the bottom of cap 13 is fastened to cap 4.

The other end cap 15 of said second case 12 includes a tapered fitting 16 constituting the delivery outlet of the pump.

Inside said second case 12, there are arranged a succession of pump stages 17, the impellers whereof are all keyed to a common axle 18 and arranged serially to one another in the fluid circuit, in a manner known per se.

FIG. 4 illustrates one feature of the invention: the first case 3 formed from a metal tube is provided at the area of the stator and stator lamination 6 with a first deep threaded portion 19 having a large pitch and being obtained by rolling over a form, thereby said large pitch threaded portion involves no removal of material but only deformation thereof, under application of a pressure force. To said first threaded portion 19 there corresponds a second threaded portion 20, of mating configuration, which is formed on the stator lamination 6, and a third threaded portion 21 formed on the bearing carrier 8. The threaded portion 20 is advantageously formed on the lathe, whereas the threaded portion 21 may be formed by either rolling or lathe machining.

At the termination of said first threaded portion 19, on the side towards the end cap 4, a first annular groove 22 is provided which serves as a continuous deep shoulder whereagainst the stator lamination 6 abuts.

In fact, to assemble the stationary portion or stator lamination 6 to the first case 3, it is introduced into the case 3 through the end where the plug 5 is located and threaded into the case itself by utilizing the provision of said threaded portions 19 and 20 until it abuts against the first annular groove 22, thus remaining clamped against it. It will be observed that a strong association is thus achieved of the first case 3 with the stator 6 without interfering with the possibility of disassembling these two parts at any desired moment.

Then the rotary portion or rotor 9 and shaft 10 are inserted and the bearing carrier 8 mounted, which latter is threaded in by the threaded portions 19 and 21 until it abuts against the stator lamination 6. In this manner, both the assembling and centering of the mechanical parts are accomplished, by simple use of the connection means provided by the large pitch rolled threads 19, 20 and 21.

A similar principle is utilized to secure the rear closure plug or end cap 5 onto the corresponding end of the first case 3 by interposition of the substantially conical elastic member 11; to this purpose, the fact, the case 3 is provided with a fourth rolled threaded portion 23, wherein the plug 5 is threaded as shown in FIG. 5. Obviously, this fourth threaded portion 23 will be roll-formed in the material of the case 3 to a lower depth, or larger minimum inside diameter than the maximum outer diameter of the threads 20,21, such as not to interfere with the insertion of the stator lamination 6 and bearing carrier 8.

Advantageously, the elastic member 11 also acts as a sealing member, once the plug 5 has been threaded into the case 3.

It will be possible to form the threaded portion 19, and consequently the threaded portion 20 as well, over only part of the axial length of the case 3, respectively of the stator lamination 6; but in this case the entire assembly shall have to be so arranged as to avoid interference of the threaded portions with the insertion of the stator lamination, where the latter has its peripheral surface unthreaded. For example, it would be possible to provide two threaded portions 19, axially spaced apart on the case 3, and have the outer diameter of the stator lamination 6, at the unthreaded area thereof, equal to or smaller than the minimum inside diameter of the threads 19, as shown in FIG. 4.

The end cap or head 4 has a cylindrical external configuration and is inserted from the front end of the case 3 to abut against a further groove or annular shoulder 23a, also formed by deep rolling in the case, on which shoulder it seals watertightly through the interposition of an O-ring 24.

Mechanical locking is instead obtained by means of an inside threaded annular end cap 25 which engages with a fifth rolled threaded portion 26, having a smaller pitch than the previously mentioned ones, which is formed at the front end of the case 3. The mechanical lock is accomplished by said annular end cap 25 engagging an annular flange 27 provided on the end cap 4.

It will be seen that the case 3 includes all of the elements required for accomplishing the assembly and centering of all the motor components, thereby the motor can be disassembled for servicing, without encountering any special difficulties.

It will also be apparent that no tie rods, screws, or studs are required for fastening the mechanical components to the case, only an arrangement of rolled threads and grooves or shoulders being provided for this purpose which, additionally to affording the peculiar features just described, further strengthen the tubular member that constitutes the case 3, as well as adjust or calibrate and center it during rolling.

Provision for rolled threaded portions according to this invention, therefore, advantageously brings about a stiffening effect for the outer case, quite contrary to what is experienced with the prior art techniques, where the cutting of the threads on the lathe, in a cast type of case, produces instead a weakened structure owing to the removal of material.

Figure 3:
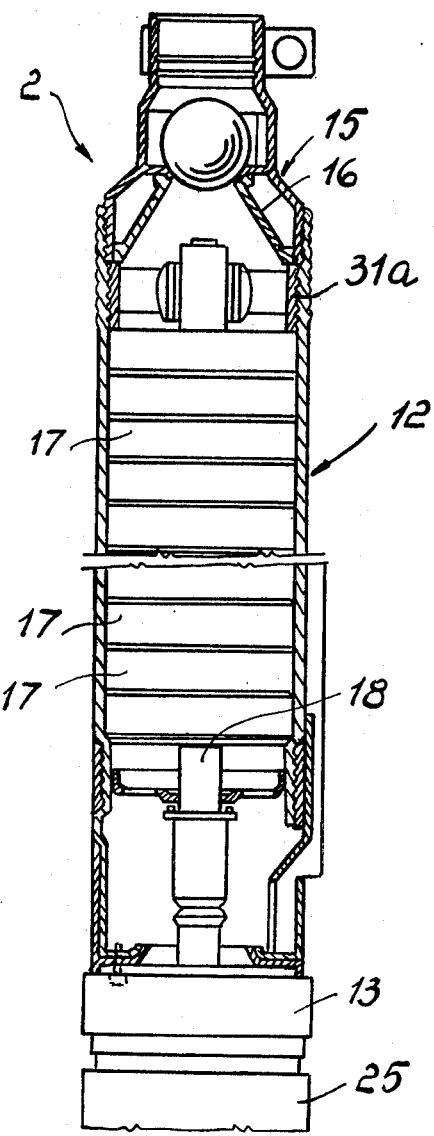
FIG. 3 is a sectional view, taken along a plane through the axis of the multistage pump of the set in FIG. 1.

The pump 2 shown in FIGS. 7 and 8 is similarly constructed, such figures illustrating the end portions thereof. The second case 12 has sixth and seventh threaded portions 28 and 29 rolled at its ends, to provide two connection regions, respectively at the suction end and delivery end, where the end cap or head 13 is threadably engaged, and respectively, where the end cap 15 is threadably engaged, which in this particular embodiment contains a check valve 30 and a bushing 31 supporting the shaft 18. The bushing 31 is carried by a threaded annular member 31a, which is threaded into the case 12 as shown in FIGS. 3 and 8. Also shown in these figures, at the bottom right corner, adjacent the end cap 13, is the pump suction end.

The resulting multistage pump is also extremely simple and easily assembled, thus achieving all of the invention objects.

In fact, the pump is assembled by first inserting the shaft 18 and impellers 17, the shaft 18 being advantageously connected to the shaft 10 through a coupling device. Then, the annular member 31a is threaded into the case 12, followed by the end cap 15 with the tapered outlet fitting 16.

FIG. 9 illustrates a second motor-pump unit or set constituting a variation of the above-described embodiment. On the right-hand side of the figure, there are also shown the internal components of the set, while for simplicity of illustration only portions of the case appear on the left-hand side thereof.

This embodiment provides a case body in form of a tubular member, indicated at 32, which is common both for the motor section and pump section. Into the cylindrical case body 32 is inserted a first shaped separation wall 33, arranged substantially transversally to the machine shaft 34.

The wall 33 has an abutment shoulder 35 of annular configuration, whereon rests a first end of the stator lamination 36, thereafter it widens further to terminate in a rolled threaded portion 37 engaging a similar rolled threaded portion 38 formed in the case body 32.

A similar, second transverse wall 39 closes the motor rear to provide a second annular abutment shoulder 40 for the stator lamination 36 as well as a seat 41 for the bearing 42 of the shaft 34. This second wall 39 terminates in a threaded portion 43, also formed by rolling, which engages with a rolled threaded portion 44 formed near the end of the case body 32.

Thus, the arrangement and mechanical assembling of the electric motor are performed by simply threading the two partition walls 33 and 39 into the pair of spaced apart threaded portions 38 and 44 and clamping the stator 36 between the walls 33 and 39, the rotor being supported on one side by the wall 39. Advantageously, spacing of the stator lamination 36 from the case body 32 is also achieved.

Understandably, owing to the first shaped wall 33 being inserted from the end of the case 32 where the threaded portion 44 is formed, the threaded portion 44 will be roll-formed such as not to interfere with the insertion of the wall 33: i.e., it will be less deep than the threaded portion 38 of the case 32 wherein the shaped wall 33 is threaded.

Now, starting from the other end of the case 32, a third shaped partition wall 45, similar to the previously described ones, is inserted which has a rolled threaded portion 46 engaging a rolled threaded portion 47 of the case body 32 to abut against an annular deeply rolled groove 48 whereagainst it remains clamped.

The third wall 45 constitutes the base for the pump body, the other closure being obtained by means of a fourth shaped partition wall 49 threadably engaging, by means of a rolled threaded portion 50, a threaded portion 51, also roll-formed, in the case body 32. Naturally, even in this instance, the threaded portion 51 will be so roll-formed as not to interfere with the insertion of the wall 45, which will engage the threaded portion 47 located more to the inside than the threaded portion 51.

Between the walls 45 and 49, threaded into the pair of threaded portions 47 and 51, there are axially retained the pump elements, while the wall 49 is configurated to directly or indirectly support the shaft 34.

This variation too achieves all of the invention objects relating to simplicity of assembly, elimination of tie rods and ancillary members, and economy of manufacture.

A case structure constructed in accordance with this invention teachings, and having a length of 1,457 mm, an outer diameter of 95 mm, and a thickness dimension of 0.8 mm, has fully achieved the objects of the invention. The material used was stainless steel. Obviously, the values indicated are those of an actually produced example, and may vary within ample limits to suit individual requirements.

From the foregoing, it will be apparent that the provision of a tubular case having rolled threads and grooves for engagement with the machine components advantageously overcomes the problems that the use of a conventional tubular case would pose. In fact, metal tubes, regardless of their manufacturing method, are not perfectly calibrated, a thing which becomes increasingly evident as the length of the tubes increases and their diameter decreases. Considering that, for example, submerged pumps involve a considerably high axial length to diameter ratio (e.g. in the embodiment mentioned above, that ratio slightly exceeds 15), and that the rotational speeds of the pumps and related motor are in the order of 3,000 rpm, it will be apparent that the dimensional tolerances between the stationary case and the rotary part must be held to a minimum, and that such a condition cannot be simply obtained through the use of tubes which have not been previously calibrated. This calibrating process, while involving an additional production step and added costs, would also involve in general a removal of material, thereby at least some portions of the tube would be weakened, which in turn would make it necessary to employ thicker wall tube stock, with obvious attendant higher cost. To the foregoing, there would add a series of machining operations for providing means of anchoring the inner components and outer accessory parts of the machine, as already mentioned in the preamble. Thus, it is apparent that the use of a metal tube as the containing case for a motor-pump set, instead of a cast case, as is generally utilized in the prior art, would not be convenient owing to the several additional manufacturing steps it involves.

Advantageously, according to this invention, the roll forming of the threads and grooves on the tube, while providing means for securing in position the motor and pump components, further strengthens the tube, and, which is even more important, simultaneously results in the calibration of the tube, thus making it possible to utilize a tube stock even for machines of considerable axial extension. The proposal of having the stator or stationary portion of the motor threaded, thereby it can be removed from the case at any subsequent moment, affords a remarkable advantage over the prior art techniques, which do not teach thread mounted stators.

It will also be appreciated that additionally to making the use of a metal tube (or several such tubes) possible as a case member for rotary machines, this invention also affords considerable simplification of the assembling and servicing operations for such machines, without increasing the processing steps involved in the machine manufacture, but rather reducing their number.

A case structure has been described and illustrated which has several discrete threaded portions, spaced apart from one another along the case length. However, it will be appreciated that the case could also be formed with a single threaded portion extending continuously throughout the case length, or with a threaded portion extending from the end wherein the plug 5 is threaded to somewhere near the groove 22, in which case the cited depth and diameter differentials in the individual threaded portions 23, 19, 26 or 44, 38, 47, 51, as specified in the above description, would be no longer required.

The invention as described is susceptible to many other variations and further modifications, all of which are intended to fall within the scope of the instant inventive concept.

Obviously, the materials and dimensions used will be any ones suitable for the individual application on hand.

I claim:

1. A case structure for rotary machines of the type having prevailingly axial extension and at least one stationary portion and at least one rotary portion, in particular for electric motors and multistage pumps, the case structure comprising at least one tubular member having two ends and a plurality of roll-formed threaded portions and at least one roll-formed groove in the wall of said tubular member, said plurality of threaded portions including at least one threaded portion for threadably supporting said at least one stationary portion within said at least one tubular member, at least another threaded portion between said at least one threaded portion and one of said ends for threadable engagement with a support for said at least one rotary portion within said at least one tubular member, and at least one further threaded portion at each of said ends for threadably engaging respective end caps of said case, said threaded portions having a depth such as to allow subsequent insertion and removal in an axial direction of said at least one stationary portion and said at least one rotary portion through said one of said ends into, and out of, said tubular member, and said at least one groove being arranged at a position adjacent said at least one threaded portion and having a depth such as to lock axially at least said at least one stationary portion.

2. A case structure according to claim 1, further comprising a further roll-formed groove in the proximity of another of said ends, said further groove locking a corresponding one of said end caps on said another of said ends and being axially spaced apart from said at least one groove.

3. A case structure according to claim 1, further comprising a substantially conical elastic member coaxially arranged with respect to said one of said ends between said one of said ends and said end cap threaded into said at least one further threaded portion of said one of said ends.

4. A case structure according to claim 1, wherein said at least one threaded portion and said at least another threaded portion are arranged directly following each other.

5. A case structure according to claim 1, comprising two tubular members rigidly connected together coaxially through respective end caps, said end caps being removably secured to each other.

6. A case structure according to claim 1, comprising a first pair of axially spaced apart threaded portions for threadably engaging respective partition walls arranged transversally to the axis of said at least one tubular member, said partition walls being configurated to clamp said at least one stationary portion therebetween and rotatably support said at least one rotary portion.

7. A case structure according to claim 6, comprising a further pair of axially spaced apart threaded portions for threadably engaging respective further partition walls configurated to provide rotatable support for said at least one rotary portion.

8. A case structure according to claim 1, wherein at least said at least one threaded portion, said at least another threaded portion, and one of said further threaded portions are arranged continuously following each other.

* * * * *